(12) United States Patent
Kuijper

(10) Patent No.: US 6,250,762 B1
(45) Date of Patent: Jun. 26, 2001

(54) IMAGE PROJECTION SYSTEM

(75) Inventor: Maarten Kuijper, Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/486,251
(22) PCT Filed: Jun. 30, 1999
(86) PCT No.: PCT/IB99/01224
§ 371 Date: Feb. 24, 2000
§ 102(e) Date: Feb. 24, 2000
(87) PCT Pub. No.: WO00/02087
PCT Pub. Date: Jan. 13, 2000

(30) Foreign Application Priority Data

Jul. 2, 1998 (EP) .................................................. 98202225

(51) Int. Cl.[7] .................................................. G03B 21/121
(52) U.S. Cl. .................................................. 353/20; 353/81
(58) Field of Search .................................... 353/20, 31, 34, 353/37, 81; 349/5, 494, 499, 8, 9

(56) References Cited

U.S. PATENT DOCUMENTS

| 5,374,968 | * | 12/1994 | Haven et al. | 353/31 |
| 5,986,815 | * | 11/1999 | Bryars | 359/634 |
| 6,082,861 | * | 7/2000 | Dove et al. | 353/20 |
| 6,089,718 | * | 7/2000 | Hashizume | 353/31 |

* cited by examiner

Primary Examiner—William Dowling

(57) ABSTRACT

The present invention relates to an image projection system (1) comprising an illumination system (3) and a modulation system comprising three image display panels (11, 13 and 15) of the relative type. The light beam coming from the illumination system (3) is color-separated and, after modulation by the image display panels, color-recombined by a color-separating and a color-recombining element (17). At least between the element (17) and the display panels (11, 13 and 15) is arranged a polarization-compensating element (31, 33, 35).

5 Claims, 2 Drawing Sheets

IMAGE PROJECTION SYSTEM

BACKGROUND OF THE INVENTION

The present invention relates to an image projection system comprising an illumination system, a modulation system having at least two reflecting image display panels of the non-diffusing type for modulating light generated by the illumination system in conformity with image information to be projected, and a projection lens system. The image projection system includes an element having a color-separating as well as a color-recombining effect, and a polarizing beam splitter which is situated between the illumination system and the element and between the element and the projection lens system.

A reflective image display panel of the non-diffusing type is understood to mean a reflective liquid crystalline image display panel of the non-diffusing type or a DMD or the like.

An image projection system comprising two or three reflective image display panels may be given a very compact construction if the color separation and the color recombination are effected by one and the same optical system. The optical system may comprise, for example, a polarizing beam splitter. Since the other optical elements of such an optical system are situated between the reflective display panels and the polarizing beam splitter, it is undesirable that a change of polarization would be effected by the color-separating and color-recombining element. However, this is the case in practice, so that the ultimate image has a too low contrast and strong color deviations for all luminance levels between white and black. This is caused by the polarization-dependent transmission of the color-separating faces of the color-separating element and the geometrical decomposition of the polarization vector on all oblique faces due to non-perpendicular incidence. Each color channel causes a specific change of polarization as a function of the wavelength and the direction of propagation through the color-separating element. In addition to polarization changes of the light, light having a given direction of polarization may be reflected in an unwanted direction, In addition to strong color shifts in a color channel, this also causes unwanted optical crosstalk when light having a certain wavelength reaches a reflective display panel which is meant to modulate light of another wavelength.

The cause of the above-mentioned polarization effects is found in the relatively large angle of incidence on the color-separating faces of the color-separating element. Dependent on the element used, this angle of incidence may be between 10–20° and 45°. For a large angle of incidence, it is difficult to have an equal transmission characteristic of a color-separating coating for both s-polarized and p-polarized light. The smaller the angle of incidence, the smaller the above-mentioned problem will be. For small angles of incidence, the difference of transmission between p and s-polarized light can be minimized more easily. But also in this case, for example for a plumbicon prism, there is still a change of polarization.

SUMMARY OF THE INVENTION

It is an object of the present invention to provide an image projection system in which the above-mentioned drawbacks are obviated.

To that end, the image projection system includes at least one polarization-compensating element is situated between the element and the image display panels.

After minimizing the differences between the transmission for s and p-polarized light in the desired wavelength range and for the desired viewing angles, by making use of a color-separating element suitable for this purpose, the remaining rotation of polarization induced by the color-separating element is reduced by means of polarization-compensating elements.

A preferred embodiment of the image projection system according to the present invention is characterized in that at least one polarization-compensating element is situated between the polarizing beam splitter and the element.

The solution to the above-mentioned problem is thus found in the addition of polarization-compensating elements. Said elements may be provided to the entrance face of the color-separating element and/or to one or more of the three exit faces of the element. "To the entrance face" is understood to be between the polarizing beam splitter and the color-separating element and "to the exit faces" is understood to be between the color-separating element and the display panels. Direct optical contact is not required.

A further embodiment of the image projection system according to the present invention is characterized in that the polarization-compensating element is a birefringent element.

A very suitable compensating element may comprise a birefringent element or a combination of birefringent elements. A birefringent element or a combination of birefringent elements ensures that a change of polarization by the color-separating element is substantially eliminated within the wavelength range for a plurality of propagation directions.

A further embodiment of the image projection system according to the present invention is characterized in that the birefringent element has a biaxial symmetry.

When the color-separating element has a viewing angle-dependent behavior which is different for the horizontal viewing directions with respect to the vertical viewing directions, the polarization-compensating element is preferably a birefringent element having a biaxial symmetry.

A further embodiment of the image projection system according to the present invention is characterized in that the birefringent element has a tilted optical axis.

If there is a difference between the positive and negative viewing directions, an element having a tilted optical axis is advantageous.

These and other aspects of the invention are apparent from and will be elucidated with reference to the embodiments described hereinafter.

DETAILED DESCRIPTION OF THE PREFERRED EMBODIMENTS

Figure 1:
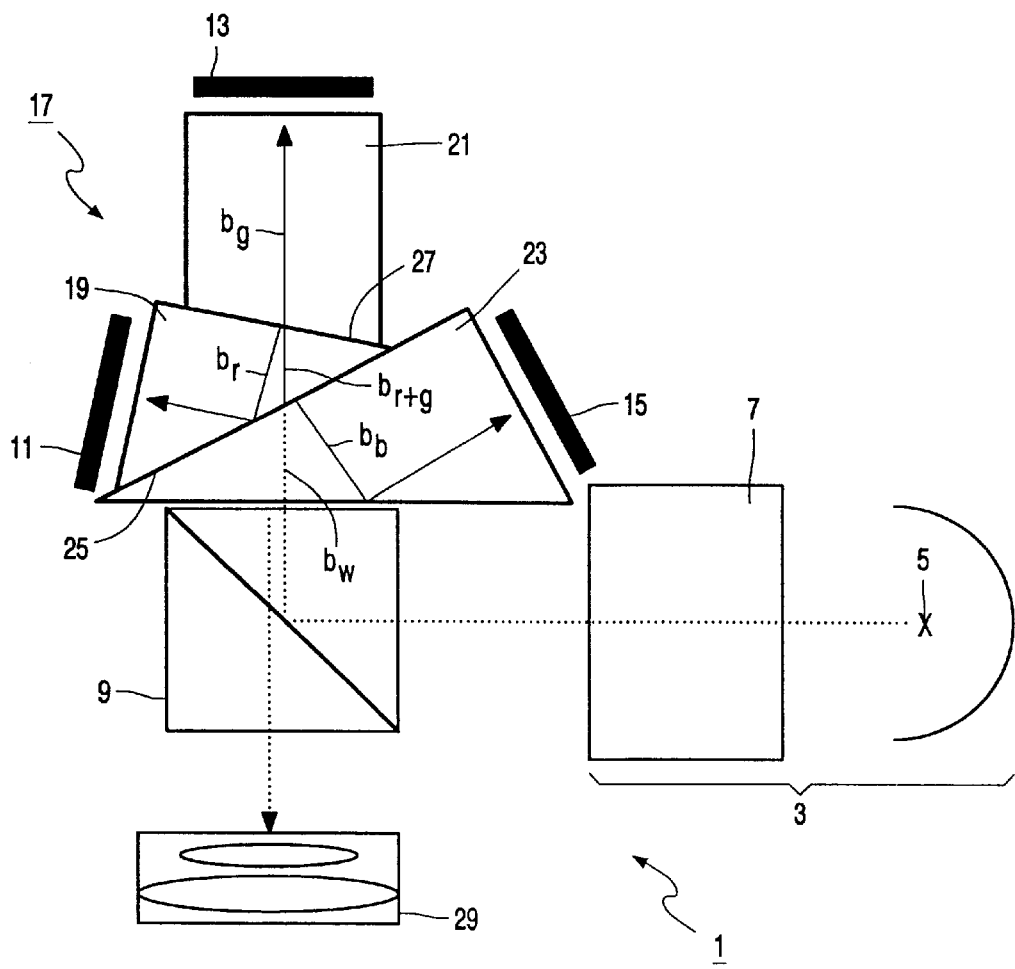
FIG. 1 shows an image projection system comprising a polarizing beam splitter and one combined color-separating and color-recombining element, according to the prior art.

FIG. 1 shows an image projection system 1 comprising an illumination system 3 having a light source 5 and illumination optics 7. The illumination optics 7 may comprise, for example, a condenser lens and an integrator system (not shown).

In case that unpolarized light coming from the illumination system 3 is incident on a polarizing beam splitter 9, approximately half of said light is sent to the modulation system comprising, in this Figure, three reflective light valves 11, 13 and 15, one for each primary color. The other half of the light beam coming from the illumination system 3 will be lost.

In case that the illumination optics 7 comprise a polarization converting system (PCS), the light beam from the light source will have been converted into a light beam having substantially the same polarization direction. In that case, the polarizing beam splitter acts as a folding element. The more perfect the PCS has converted the unpolarized light into polarized light, the less light will be lost at the polarizing beam splitter.

Consequently, the light beam bent by the polarizing beam splitter is incident on a color-separating element 17. Said element 17, of which the shown embodiment is also called in plumbicon prism, comprises three prisms 19, 21 and 23. At a first interface 25, the white light beam $b_w$ from the illumination system is split up is a blue sub-beam $b_b$ and a red-green sub-beam $b_{r+g}$. At a second interface 27, the red-green sub-beam $b_{r+g}$ is split up in a red sub-beam $b_r$ and a green sub-beam $b_g$. Each of the sub-beams $b_r$, $b_b$ and $b_g$ is incident on a respective reflective light valve 11, 13, 15 which is suited to modulate the light incident thereon.

After modulation by the light valves 11, 13 and 15, the modulated sub-beams are recombined by the element 17. Said element 17 now performs the function of a color-recombining element. In case the light valves are polarization modulating light valves, the parts of the combined modulated beams which have to result in bright parts in the image are subsequently transmitted to the projection lens system 29. The polarizing beam splitter then acts as an analyzing polarizer.

One of the problems in an image projection system as described above is, that due to an oblique incidence of the beams to be color-separated or color-recombined on the interfaces of the element 17, the polarization directions will change because the transmission of the color-separating and recombining surfaces is polarization dependent. This difference and variation in transmission results in a low contrast and color deviations in the image.

Figure 2:
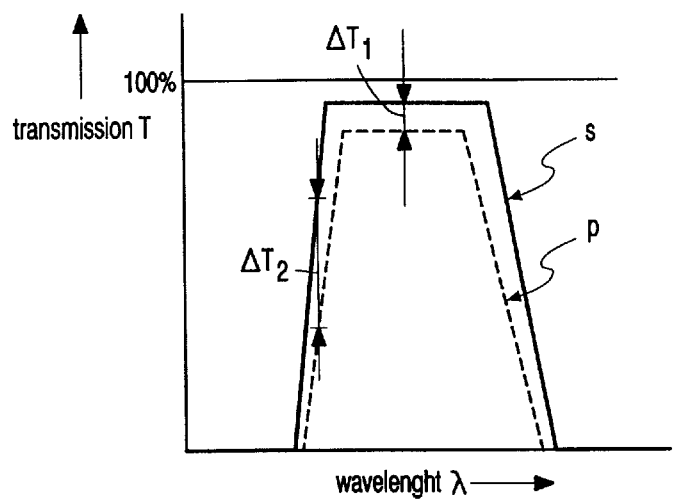
FIG. 2 illustrates the difference in transmission for p-polarized and s-polarized light.

FIG. 2 illustrates, for a color-separating or color-recombining interface, the transmission as a function of wavelength for s-polarized and p-polarized light. In a certain wavelength range, the difference in transmission is relatively small ($\Delta T1$), while at the edges of said range the difference becomes much larger ($\Delta T2$).

The present invention overcomes said drawbacks by providing at least one polarization-compensating element 31, 33, 35 between the element 17 and the light valves 11, 13, 15.

Figure 3:
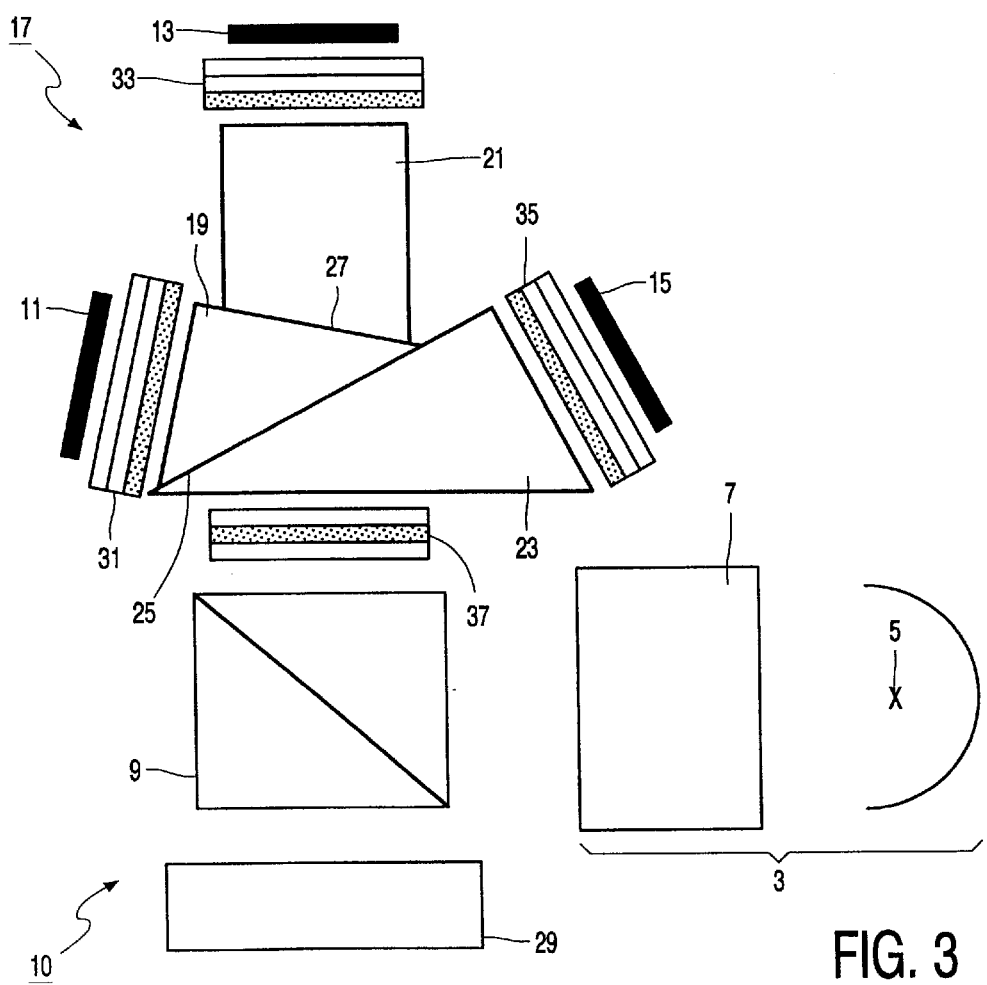
FIG. 3 shows an image projection system comprising a polarizing beam splitter and one combined color-separating and color-recombining element, according to the present invention.

FIG. 3 shows an embodiment of an image projection system 10 according to the present invention.

Contrast and color balance of the image can be further improved by providing a polarization-compensation element 37 between the color-recombining element 17 and the polarization beam splitter 9.

A preferred embodiment of such polarization-compensating elements 31, 33, 35 and 37 is a birefringent element or a combination of birefringent elements.

The sensitivity of the color-separating and recombining element with respect to the viewing angle may vary for the vertical and the horizontal viewing direction. In that case, the birefringent element preferably has a biaxial symmetry. If there is moreover a difference between the positive and the negative viewing directions, the birefringent element preferably has a tilted optical axis.

Birefringent elements as mentioned above are commercially available from a.o. Nitto Denko and Fuji Film.

What is claimed is:

1. An image projection system comprising an illumination system, a modulation system having at least two reflecting image display panels of the non-diffusing type for modulating light generated by the illumination system in conformity with image information to be projected, and a projection lens system, the image projection system comprising an element having a color-separating as well as a color-recombining effect, and a polarizing beam splitter which is situated between the illumination system and the element and between the element and the projection lens system, wherein at least one polarization-compensator is situated between the element and the image display panels and a further polarization-compensator is situated between the element and the polarizing beam splitter, and wherein said at least one polarization-compensator and said further polarization-compensator are configured to compensate for a change of polarization of light leaving the element.

2. An image projection system as claimed in claim 1, wherein the polarization-compensator is a birefringent element.

3. An image projection system as claimed in claim 2, wherein the birefringent element has a biaxial symmetry.

4. An image projection system as claimed in claim 2, wherein the birefringent element has a tilted optical axis.

5. A projection apparatus comprising:
   a light source which provides input light;
   a polarizing beam splitter which bends a portion of said input light to for a bent light;
   a prism assembly which separates color components of said bent light;
   reflective imagers which receive said color components to form color image lights, said prism assembly combining said color image lights to form an image light, and said polarizing beam splitter providing said image light to a projection lens;
   polarization-compensators located between said reflective imagers and said prism assembly, said polarization-compensators being configured to compensate for a change of polarization of said color components leaving said prism assembly; and
   a further polarization-compensator located between said prism assembly and said polarizing beam splitter, said further polarization-compensator being configured to compensate for a change of polarization of said image light leaving said prism assembly.

* * * * *